(12) United States Patent
Thrue et al.

(10) Patent No.: US 10,907,614 B2
(45) Date of Patent: Feb. 2, 2021

(54) FOUNDATION BUILDING SYSTEM FOR AN OFFSHORE WIND TURBINE AND METHOD FOR INSTALLATION OF AN OFFSHORE WIND TURBINE

(71) Applicant: SIEMENS GAMESA RENEWABLE ENERGY A/S, Brande (DK)

(72) Inventors: Carsten Thrue, Braedstrup (DK); Soeren E. Nielsen, Skanderborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/217,371

(22) Filed: Dec. 12, 2018

(65) Prior Publication Data
US 2019/0195201 A1 Jun. 27, 2019

(30) Foreign Application Priority Data
Dec. 22, 2017 (EP) ..................................... 17209983

(51) Int. Cl.
*F03D 13/25* (2016.01)
*F03D 80/80* (2016.01)
(Continued)

(52) U.S. Cl.
CPC ............. *F03D 13/25* (2016.05); *E02D 27/52* (2013.01); *F03D 13/20* (2016.05); *F03D 80/82* (2016.05);
(Continued)

(58) Field of Classification Search
CPC .......... F03D 13/20; F03D 13/22; F03D 13/25; F03D 80/80; F03D 80/82; F03D 80/85; F03D 80/88
(Continued)

(56) References Cited

U.S. PATENT DOCUMENTS

| | | | | |
|---|---|---|---|---|
| 6,157,088 A | * | 12/2000 | Bendix | ................. E04H 12/085 290/55 |
| 2007/0125037 A1 | * | 6/2007 | Meiners | ................ E04H 12/085 52/848 |

(Continued)

FOREIGN PATENT DOCUMENTS

| CN | 102490876 A | 6/2012 |
|---|---|---|
| CN | 103225589 A | 7/2013 |

(Continued)

OTHER PUBLICATIONS

Extended European Search Report for Application No. 17209983.0, dated Jun. 6, 2018.

*Primary Examiner* — Tara Mayo-Pinnock
(74) *Attorney, Agent, or Firm* — Schmeiser, Olsen & Watts LLP (57) ABSTRACT

Provided is a foundation building system for an offshore wind turbine, whereby a monopile is configured to be placed on the seabed, having an upper portion with a first attachment interface for attaching a foundation platform unit, at least one internal, second attachment interface in an interior cavity of the monopile for attaching at least one electrical platform unit, and a third attachment interface for attaching a tower of the offshore wind turbine atop the at least one electrical platform unit, wherein the upper portion is to be placed at least partly above sea level, the foundation platform unit providing at least one foundation platform extending around the tower when installed, and the at least one electrical platform unit comprising at least one platform for electrical equipment for guiding and/or connecting of an connection cable for connecting the offshore wind turbine.

17 Claims, 5 Drawing Sheets

(51) Int. Cl.
  *F03D 13/20*  (2016.01)
  *E02D 27/52*  (2006.01)
  *E02B 17/00*  (2006.01)

(52) U.S. Cl.
  CPC ... *E02B 2017/0043* (2013.01); *F05B 2240/95* (2013.01)

(58) Field of Classification Search
  USPC ............................... 405/229, 231, 250, 251
  See application file for complete search history.

(56) References Cited

U.S. PATENT DOCUMENTS

| | | | |
|---|---|---|---|
| 2011/0006538 A1* | 1/2011 | Fischer et al. | F03D 13/25 290/55 |
| 2012/0257973 A1* | 10/2012 | Rebsdorf et al. | F03D 80/00 416/146 R |
| 2013/0193691 A1 | 8/2013 | Mehta et al. | |
| 2014/0075860 A1* | 3/2014 | Edenfeld et al. | E04H 12/34 52/173.1 |
| 2014/0345510 A1 | 11/2014 | Li et al. | |
| 2015/0345463 A1* | 12/2015 | Nielsen | F03D 80/88 416/244 A |
| 2016/0215754 A1 | 7/2016 | Seidel | |
| 2016/0298601 A1 | 10/2016 | Weng et al. | |
| 2017/0218917 A1 | 8/2017 | Church | |

FOREIGN PATENT DOCUMENTS

| | | |
|---|---|---|
| DE | 102015000787 A1 | 7/2016 |
| EP | 1788242 A1 | 5/2007 |
| EP | 2511525 A2 | 10/2012 |
| WO | 2016019466 A1 | 2/2016 |

* cited by examiner

FOUNDATION BUILDING SYSTEM FOR AN OFFSHORE WIND TURBINE AND METHOD FOR INSTALLATION OF AN OFFSHORE WIND TURBINE

CROSS-REFERENCE TO RELATED APPLICATION

This application claims priority to European Application No. 17209983.0, having a filing date of Dec. 22, 2017 the entire contents of which are hereby incorporated by reference.

FIELD OF TECHNOLOGY

The following concerns a foundation building system for an offshore wind turbine comprising a monopile, and an installation method using the foundation building system.

BACKGROUND

Usually, a monopile based foundation for an offshore wind turbine is being installed by, for example of the monopile into the soil/material of the seabed, followed by installation of a so-called transition piece (TP) on top of the monopile using bolts or a combination of gravity and grouting. The monopile and the TP can potentially be supplied by same supplier, which however requires the supplier to master a number of different engineering skills. Hence, in most projects multiple subcontractors are involved in the supply of these two units, often leading to a high number of work handover, requiring much project management attention.

The monopile may be formed as a substantially tubular construction with required structural reinforcements and means for connection cable installation. If multiple offshore wind turbine, for example in a wind park, are to be connected, a so-called array cable for an array of wind turbines may be used as connection cable.

However, in today's offshore wind turbine foundations, most technical support systems are part of the TP, for example comprising:
a) a foundation platform, either formed by a steel or by a concrete structure,
b) an external ladder and a boat landing arrangement for accessing the foundation platform,
c) an attachment interface, in particular comprising a flange, for mounting of a tower of the offshore wind turbine by means of bolts or another attachment means, wherein the attachment interface may be located substantially at the same vertical level as the foundation platform,
d) an internal bolt tightening platform for technicians to tighten tower connecting bolts,
e) a switchgear platform for connection of the connection cables to a switchgear, wherein switchgear can be any combination of electrical disconnect switches, fuses and/or circuit breakers used to control, protect and isolate electrical equipment,
f) a so-called "airtight deck"/hang-off platform at the TP bottom, usually comprising means for array cable clamping/fixing, and/or
g) navigation markings and lights on the foundation platform,
h) a service crane (in particular Davit type crane) on the foundation platform.

The tower of the offshore wind turbine (or wind turbine generator—WTG) usually comprises the entrance to the offshore wind turbine installation, including a tower door and an external platform to allow personal to move between the tower door and the foundation platform. The foundation platform and the tower door are not at same level according to the state of the art, but at least some steps on the external platform apart. Thus, transporting heavy equipment from the foundation platform into the tower is further complicated by this height difference.

In an effort to provide an improvement and to facilitate entering the tower and transporting heavy equipment, the tower door has been moved from the tower to the TP in some installations, wherein the TP may be referred to as an extended TP. Here, the flange for mounting the tower has, in comparison to other installation, been raised to a level of i.e. 5 meters above the foundation platform level, the foundation platform being flush with the tower entrance platform. This leads to an improved working environment, but complicates other parts of the offshore wind turbine installation by not having the tower lift (elevator) available.

Ideally, the tower is pre-assembled in an onshore facility, where multiple tower sections are connected, i.e. by means of bolts, and the tower internal equipment is installed and commissioned. This includes installation and commissioning of the tower lift, operating from the entrance platform to a highest possible point in the tower, for example an upper platform inside the tower.

Since, in extended TP installations as describe above, the entrance platform is now shifted to foundation platform level, the tower lift will not be operating to this level, but to a elevated with respect to this entrance platform, i.e. 5 meters higher. Extending the lift operation to the entrance platform requires additional installation time, increasing the cost of the overall installation. Further, an inspection of the installation by a third party may be required before the lift is allowed to be used, which should preferably be arranged onshore prior to tower installation on the foundation. Using the extended TP concept, this check of the installation by a third party has to be performed offshore, which further complicates the logistics.

When installing an offshore wind turbine on a monopile based foundation, the process normally starts with hammering, pressing or in other ways driving the monopile into a predefined depth of the seabed. This is done using special vessels, able to handle the often more than 1.000 t heavy monopiles. The same installation vessel also installs the TP, normally either by means of bolted or grouted attachment means. When the TP is installed, a protective cap (often referred to as a "China hat") may serve as protection against environmental effects for the equipment inside the foundation, until the tower is installed. After the foundation is installed, the connection cable, for example an array cable eventually connecting the individual offshore wind turbines with either an offshore or onshore substation, will be installed and connected. To achieve this, a cable laying vessel is used for placing the cables into the seabed.

In the exemplary case of a cable entering the monopile near the seabed, purpose-built tools are then installed on top of the foundation for pulling the connection cable into the foundation. Prior to this, the protective cap may need to be removed.

The pulling tools or, in general, cable moving means, normally define a strong point centered above the TP, and are placed on the flange towards the (not yet installed) tower. Hatches need to be opened, or floor plates removed, on the platforms between the strong point and the bottom platform of the TP, often referred to as the airtight deck or hang-off platform. The connection cable will be pulled towards the airtight deck using dedicated guiding means in the TP, where it may be inserted into the TP through a combined opening and clamping device. The connection cable may be pulled by a wire using a winch type equipment, wherein the strong point serves as a guide for pulling in vertical direction. When sufficient cable length has been pulled into the TP, it is clamped and protective layers are removed to expose individual cable cores to be connected, for example via switchgear. This work is quite polluting, hence sensitive parts may need covering. At least some cleaning is usually needed before the next team of technician start up the cable termination. This team will connect the individual connection cable cores to the switchgear and perform a final test. Further, they will install optical fibers into a splice box and prepare other interfaces for the tower to be mounted.

Also, service and maintenance routines of offshore wind farms are subject of continuous optimization, which has led to the development of purpose-built Service Operation Vessels (SOV). These include safe means of transferring personnel from the vessel to the foundation platform, for example by using a wave movement compensated gangway arrangement, thus allowing technicians to transfer safely from the SOV to the foundation platform while the SOV is maintaining its position by intelligent control. In practice, this obviates the need for the external ladder and boat landing equipment on the foundation platform, lowering the overall wind farm cost.

The same SOVs may already comprise a versatile crane configured to transport equipment from the vessel to the foundation platform or vice versa. Thus, a foundation platform service crane may also be spared to reduce the total cost of the wind farm. However, the foundation platform service crane might form part of the safety chain for working on the offshore wind farm and hence may be required in some cases.

Industrialization is essential for further lowering the cost of energy in offshore wind farm projects. Despite several efforts, there exist arguably no two offshore wind farms with same design. The design does not necessarily only relate to the wind turbine itself, but also to its supporting structure, consisting of the tower and the foundation. The dominating foundation technology is the monopile concept, but there is no general approach towards standardization or industrialization of this approach yet.

SUMMARY

An aspect relates to a foundation installation system for an offshore wind turbine, allowing further improvements in industrialization and standardization for monopile-based foundations.

A foundation building system for an offshore wind turbine according to embodiments of the invention comprises:
  a monopile to be placed on the seabed, having an upper portion with a first attachment interface for attaching a foundation platform unit, at least one internal, second attachment interface in an interior cavity of the monopile for attaching at least one electrical platform unit, and a third attachment interface for attaching a tower of the offshore wind turbine atop the at least one electrical platform unit, wherein the upper portion is to be placed at least partly above sea level,
  the foundation platform unit providing at least one foundation platform extending around the tower when installed, and
  the at least one electrical platform unit comprising at least one platform for electrical equipment for guiding and/or connecting of an connection cable for connecting the offshore wind turbine and/or an internal cable for the offshore wind turbine.

In particular, the upper portion and thus all attachment interfaces will be above sea level when the monopile is installed. Further, in this description, "foundation" shall be understood as the construction on which the offshore wind turbine components from the tower up (comprising the tower, a nacelle, a hub, a canopy and blades) are erected. The monopile is preferably cylindrical in shape, i.e. a mainly tubular structure.

It is proposed to change the setup of the foundation for the wind turbine to unit allowing a modular, standardisable design. Where monopile foundations usually consisted of two major components, namely the monopile and the transition piece, it is suggested to now use three major components in a revised design, namely the monopile, an external foundation platform unit and an internal electrical platform unit. At least regarding the upper portion of the monopile, the monopile may be standardised, in particular regarding the attachment interfaces (which may also be called attachment devices). These comprise the first attachment interface for mounting the foundation platform unit, the second attachment interface for installing the internal electrical platform unit or units and the third attachment interface for mounting the tower. Preferably, at least one of the attachment interfaces comprises a flange and/or at least one protrusion for attachment via a nut-and-bolt arrangement. Flanges for nut-and-bolt arrangements are already commonly used in offshore wind turbines and particularly suited for standardisation. Flanges used in the attachment interfaces of embodiments of the invention may also be sectioned, resulting in protrusions, in particular bracket-like protrusions, consecutively placed in (in particular regular) distances along a corresponding surface of the monopile. In concrete embodiments, flanges or protrusions may be plates welded to the respective surfaces.

While the upper portion of the monopile may be standardized, the lower portion may structurally be adapted to local conditions on the installation site, for example water depth, soil conditions in the seabed, and overall load impact. Hence, a lower portion below the standardized upper part can be customized to meet the local conditions.

As also the other two major components and/or the tower may be subject to standardization, at least regarding their attachment interfaces (which may also comprise flanges) to interact with the respective attachment interfaces of the monopile, embodiments of the invention provide a further step towards industrialization of offshore wind turbine monopile foundations, since the requirements for compatible units may be clearly formulated and simplified, in particular when using standardised attachment interfaces. This reduces the overall risk of an installation project and better allows for multiple contractors to work together providing a well-defined scope. Since offshore wind farms tend to be significant installations with national impact, often the involvement of local companies is demanded. Embodiments of the present invention with its use of predefined interfaces facilitates these procedures.

Embodiments further optimizes the overall workflow of manufacturing, logistics, installation and commissioning of the offshore wind turbines of a wind farm. In particular, installation is simplified and sped up. The electrical platform unit can be installed with the mounting platform providing simplified access and options for protections measures, as further described below, already in place. It is easily transportable and may also be largely standardized.

The connection cable may preferably be an array cable connecting multiple wind turbine, e.g. serially. The connection cable may enter the installation in multiple different ways. While, for example, a J-tube running parallel to monopile may be used, it is preferred to have the connection cable enter the monopile interior below sea level, in particular at the bottom of the monopile adjacent to or even in the seabed, using a waterproof connection cable. It has also been proposed to have the connection cable enter the foundation via the foundation platform, which is also less preferred.

It is noted that the third attachment interface may also be interior, in particular at the upper edge of the monopile, delimiting the cavity which is, in general, open at the upper end of the monopile, providing an opening for insertion of the electrical platform unit, in particular from the foundation platform of the already installed foundation platform unit. The third attachment interface will usually be positioned higher than second attachment interface.

In a preferred embodiment, the first and third attachment interfaces are at the same height of the monopile, in particular being formed by an interior flange of the third attachment interface opposing an exterior flange of the first attachment interface. While the third attachment interface may, in particular, be of the same construction as known from transition pieces of prior art, the first, external attachment interface is added as attachment means for the foundation platform unit providing the external foundation platform. Preferably, the first attachment interface can be implemented as a part of a tower flange of the third attachment interface, in particular by using a T-type flange at the upper end of the monopile instead of an L-type flange. In any case, it is preferred that the first attachment interface is positioned near the top of the monopile exterior.

Preferably, the first attachment interface may hold the foundation platform unit in position at least partly by means of the gravitational force of the foundation platform unit. Alternatively or additionally, other attachment arrangements may be used, in particular nut-and-bolt arrangements.

Preferably, the inner profile of the foundation platform unit matches the outer profile of the monopile, such that the foundation platform unit may be interlockingly fit over the monopile, guided by the outer profile of the monopile to the supporting first attachment interface. Alternatively or additionally, the foundation platform unit and/or the monopile may comprise further guiding means to slidingly guide the foundation platform unit extending around the monopile onto/into contact with the first attachment interface.

In a preferred embodiment, the foundation platform unit may comprise a cast concrete structure. Alternatively, other materials may be used, for example metals like steel.

The foundation platform unit, in particular the concrete structure forming the foundation platform, may have different geometrical shapes. Preferably, the foundation platform unit or the concrete structure, respectively, may be cast as a slab, i.e. may have the same thickness over at least most of its extent. However, other designs fitting the geometrical needs may be chosen.

In an especially preferred embodiment, the dimensions of the foundation platform unit and the position of the first attachment interface are chosen such that the foundation platform is level with a tower entrance of the tower when both are installed on the monopile. In other words, a vertical distance between the mounting surface of the foundation platform unit towards the first attachment interface and its foundation platform surface is chosen to allow for the foundation platform surface (platform deck) to be flush with an entrance platform of the tower and/or the door sill of a door for entering the tower, respectively. In this manner, direct and comfortable access to the tower is enabled without using an additional external platform. Effort, complexity and cost can be saved due to a simplified design. Additionally, the combination of having the tower door flush with the foundation platform and a tower configuration with a tower lift readily mounted and commissioned further provides for a work and cost effective installation process.

Preferably, the foundation platform unit may comprise a staircase at its inner boundary allowing access to the cavity and/or the at least one electrical platform unit in the monopile when the foundation platform unit has been installed. These stairs may, preferably, be formed during casting of at least part of the foundation platform unit, in particular the concrete structure. Thus, an advantageous embodiment of the foundation platform has a staircase casted into its design for accessing the monopile interior during the installation phase, in particular also the electrical platform unit once installed. Further preferably, the foundation installation system also comprises a cover plate for the staircase after installation of the tower. The staircase section can later be covered by a cover plate, since the interior of the monopile, i.e. the electrical platform unit, may be accessed through the tower.

The foundation platform unit may advantageously comprise at least one installation aid for at least one installation device used during installation, in particular a cable moving device, and/or for a protective cap for protection of the cavity prior to installation of the tower. In particular, the installation aid may comprise at least one threaded hole in the foundation platform, in particular cast in during casting of the concrete structure. Those threads casted into the foundation platform surface at predetermined, suitable positions are then used for, for example, anchoring a cable pulling device such that its strong point is centered above the monopile and in particular the third attachment interface, and/or a protective cap.

Preferably, the foundation platform unit may further comprise an electrical installation, in particular navigation lights, and/or a boat landing arrangement and/or an anchor point and/or at least one cable installation means, in particular tubes cast into the concrete structure, and/or at least one socket, in particular adjacent to or in a wall of the staircase, and/or a handrail and/or a gate and/or an identification means. A preferred version of the foundation platform unit further has means for cable installation incorporated, i.e. by tubes casted into the concrete structure. Such cable installation means may run between predefined positions of mounting an electrical installation, for example navigation lights, and preferably additionally end in a socket installation at the staircase, allowing easy and comfortable power supply to tools and the like.

Preferably, the foundation platform unit may be completely pre-manufactured at the supplier for the foundation platform unit. This means that, for example, appurtenances such as handrails and gates, identification numbering and electrical installations may already be pre-installed before the foundation platform unit is delivered to the installation site. The electrical installations such as a navigational means are usually depending on the actual position of the wind turbine in an offshore wind farm, meaning the individual foundation platform units may already be designated at the supplier including suitable identification marking and suitable navigational means. In a preferred version, the electrical installations may be subject to a final test to verify that all systems work according to the specifications, and the foundation platform unit is then sent directly to the offshore wind farm for installation or alternatively to another logistic station in the offshore wind farm supply chain.

It is noted that in cases when SOVs as initially described are used, an external ladder with its boat landing arrangement and/or a service crane (Davit type crane) on the foundation platform may be excluded from consideration as an obvious measure to reduce complexity and cost, but either of the facilities can easily be incorporated in the concept if needed.

In an advantageous embodiment, the foundation building system may further comprise a protective cap for protection of the cavity prior to installation of the tower. As already discussed above, the foundation platform may already be prepared for the installation of such a protective cap, which is often also called "China hat". Attachment devices for the protective cap may comprise threaded holes, as discussed above, and/or nut-and-bolt arrangements. The protective cap may preferably comprise a protection structure to withstand environmental conditions. The protection structure may also comprise a protective screen.

In an especially preferred embodiment, the protective cap may comprise a cable moving device, in particular a cable pulling device for pulling the connection cable from an entry point into the monopile or from outside into the upper portion cavity, and/or an entry hatch, in particular aligned with the staircase as discussed above. The cable moving device may, for example, be or comprise a guide means for guiding a cable pulling wire from the cable pulling device mounted on the foundation platform towards a connection cable entry point at the bottom of the monopile. The protective cap may also comprise a hatch in its protective screen, in particular in the area of the staircase, which may preferably be casted into the concrete structure of the foundation platform.

Concerning the at least one electrical platform unit, it may preferably comprise a supporting structure defining at least one of
- a hang-off platform, in particular having a clamping device for the connection cable, supporting the weight of the connection cable guided up through the monopile,
- a switchgear platform having at least one switchgear for connecting to the connection cable to an interior cabling assembly, and
- a tower installation platform extending below the third attachment interface.

A so-called "hang-off" platform is a means of supporting the weight of the connection cable which rises vertically out from the seabed to connect with the internal cabling of the wind turbine. As already discussed, in the case of a monopile foundation, the connection cable will often be fed up the inside of the monopile to an especially reinforced internal platform, where the outer casing of the cable is gripped tightly by a clamping device to support its considerable weight hanging below. At, or immediately above that platform, switchgear is provided, in particular for connecting to the lighter internal cabling of the offshore wind turbine. A corresponding switchgear platform may thus also be provided in at least one of the at least one electrical platform units. In particular as the uppermost platform, a tower installation platform or bolt tightening platform may be provided to facilitate mounting of the tower using the third attachment interface.

The supporting structure is capable of containing the at least one platform and the electrical equipment. It may be formed of profiles, plates or a combination thereof. In a preferred embodiment, the supporting structure is standardized and/or comprises steel profiles and floor plating for the platforms. Cable guiding means and electrical equipment, in particular the switchgear, may also be provided which are readily prepared with surface protection and mounting means for assembly by means of bolts in a local preassembly site, e.g. at the supplier. This results in an easily transportable electrical platform unit that could be produced in series. The overall installation and product cost is significantly lowered.

Preferably, the electrical platform unit and/or the second attachment interface further comprises a sealing means for sealing the upper portion cavity containing the electrical platform unit from the cavity extending below the level of the hang-off platform. Since the interior of the monopile below sea level usually contains sea water, the electrical equipment of the electrical platform units and/or the offshore wind turbine are to be protected from its adverse influence. Thus, appropriate sealing means may be provided at the hang-off platform, which for this reason may also be termed "airtight deck".

The electrical platform unit may also be held in place by gravity on the second attachment means, however, further attachment arrangements may be used, for example nut-and-bolt-arrangements or the like, in particular when sealing is to be implemented.

While it is preferred to have the hang-off platform integrated into a single electrical platform unit to be used, another advantageous embodiment of the invention may provide that at least two electrical platform units are provided, one implementing the hang-off platform and another implementing at least the switchgear platform. The hang-off platform may thus be a separate electrical platform unit that can be installed prior to the remaining part of the electrical platforms. If the hang-off platform is separate, it allows for cable pulling into the foundation in an earlier process step, while the next step would be the installation of the remaining electrical platform unit(s) including cable connection to the switchgear and connection of other communication cables and optical fibres. In the process of pulling connection cables into the upper portion of monopiles through the hang-off platform, cleaning of the monopile interior may be required due to sea water, mud and other materials being pulled up with the connection cable, combined with the cutting and grinding processes required for stripping the single conductors of the connection cable. Hence it is of advantage to only install the remaining electrical platform unit after connection cable pulling and cleaning, as the most sensitive equipment is provided as a part of this remaining electrical platform unit.

The inventive method for installing an offshore wind turbine using a foundation building system according to embodiments of the invention comprises the steps of:
- installing the monopile at a predetermined location for the offshore wind turbine in the seabed,
- installing the foundation platform unit on the monopile using the first attachment interface,
- installing the electrical platform unit inside the cavity using the second attachment interface,
- connecting the connection cable in the electrical platform unit, and
- installing the wind turbine using the third attachment interface.

All features and remarks regarding the foundation installation system also apply to the method, such that the same advantages can be achieved.

After installation of the monopile at the installation site, the foundation platform unit is mounted using the first attachment interface on the exterior of the monopile and possibly a corresponding attachment interface of the foundation platform unit. After this, the electrical platform units are added, in preferred embodiments either before or after the installation of the protective cap, Preferably, the presence of the staircase is exploited for access to the interior of the monopile and, in particular, installed electrical platform units. The electrical platform unit and/or the second attachment device and/or the staircase are preferably dimensioned and/or positioned, respectively, such that the staircase lands on the level of the third attachment interface, or the uppermost platform of the electrical platform unit, in particular the tower installation platform or the switchgear platform.

The cable pulling device preferably provided as a part of the protective cap is then, in an embodiment, used to pull the connection cable up from an entry point at the bottom of the monopile. Cleaning may then be performed and electrical connections established, all under the protection of the protective cap. After the connection cable has been pulled into the upper portion of the monopile and connected to the switchgear, and other supporting installations are finished, a test can be performed on the connection cable system prior to the mounting of the tower. This provides a reliable indication of the finalization and functionality of the connection cable works.

Finally the tower, the nacelle and the rotor of the offshore wind turbine are installed and the offshore wind turbine may be commissioned. This follows the already established process step of removal of the protective cap. If provided, the staircase may be covered with a cover plate.

BRIEF DESCRIPTION

Some of the embodiments will be described in detail, with references to the following Figures, wherein like designations denote like members, wherein.

DETAILED DESCRIPTION

In the following, embodiments of the current invention are discussed with respect to FIGS. 1 to 5, wherein the sequence of the Figures and the installation progress shown correlates with the steps of an embodiment of the method according to embodiments of the invention.

Figure 1:
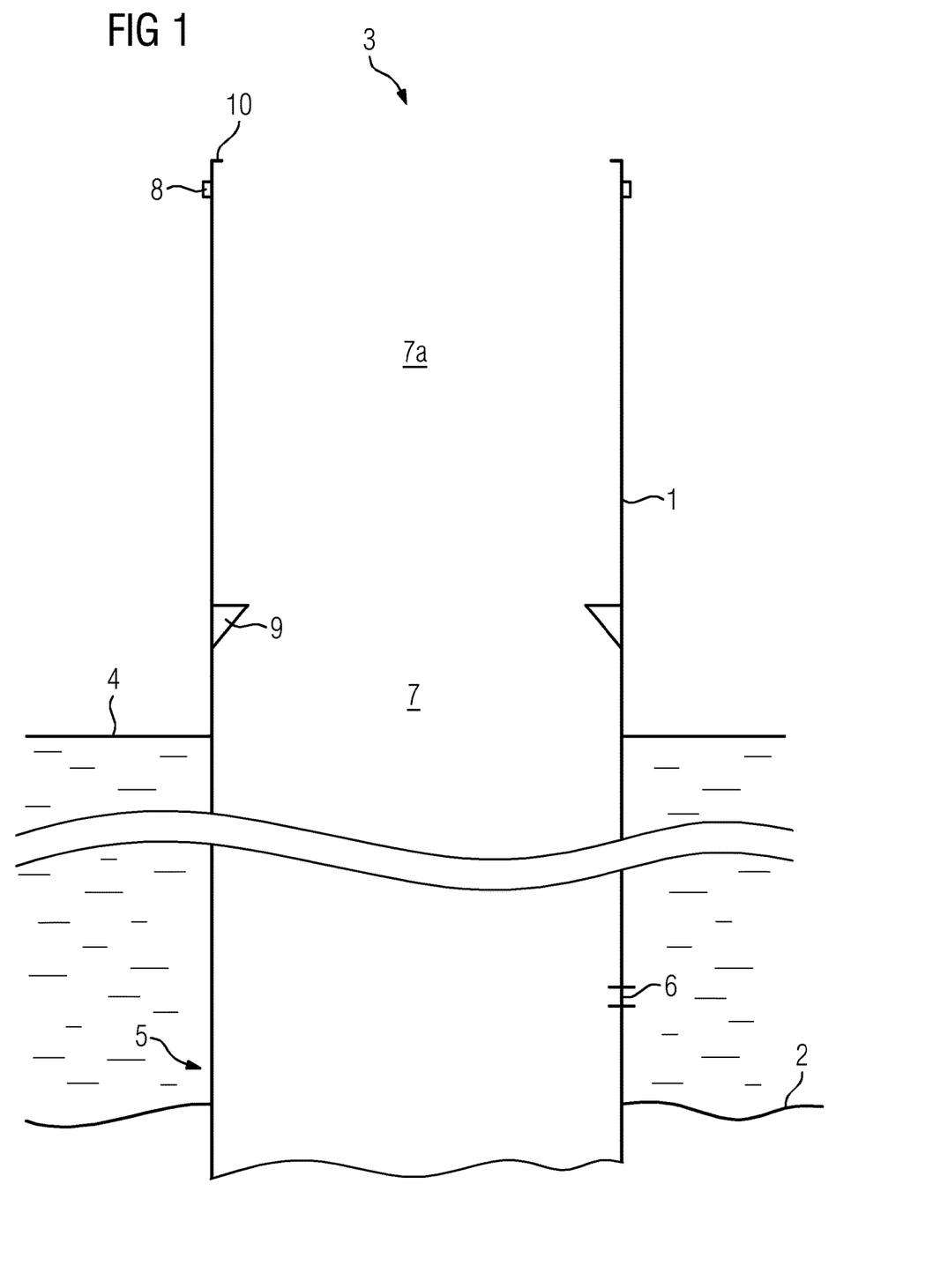
FIG. 1 is a principle drawing of a monopile being installed in a seabed at an installation site.

FIG. 1 shows an already installed monopile 1 of a foundation installation system. The monopile 1 has already been hammered and/or otherwise driven into the seabed 2 such that an upper portion 3 of the monopile elevates over the sea level 4. At the bottom 5 of the monopile 1, also an entry point 6 for a connection cable, in particular an array cable, is indicated. Using the entry point 6, the connection cable can be guided into the interior cavity 7 of the monopile 1 and be drawn up into the upper portion 3, as will be discussed further with respect to FIG. 4.

The upper portion 3 comprises three different attachment interfaces 8, 9 and 10, which are all implemented as flanges, wherein a first attachment interface 8 is provided on the outer surface of the monopile 1, whereas the second attachment interface 9 and the third attachment interface 10 are provided on an interior surface of the monopile 1.

The first attachment interface 8 is provided for installing a foundation platform unit, the second attachment interface 9 for installing at least one electrical platform unit in the upper portion cavity 7a and the third attachment interface 10, located at the upper end of the monopile 1, is a known attachment means for the tower of an offshore wind turbine.

Figure 2:
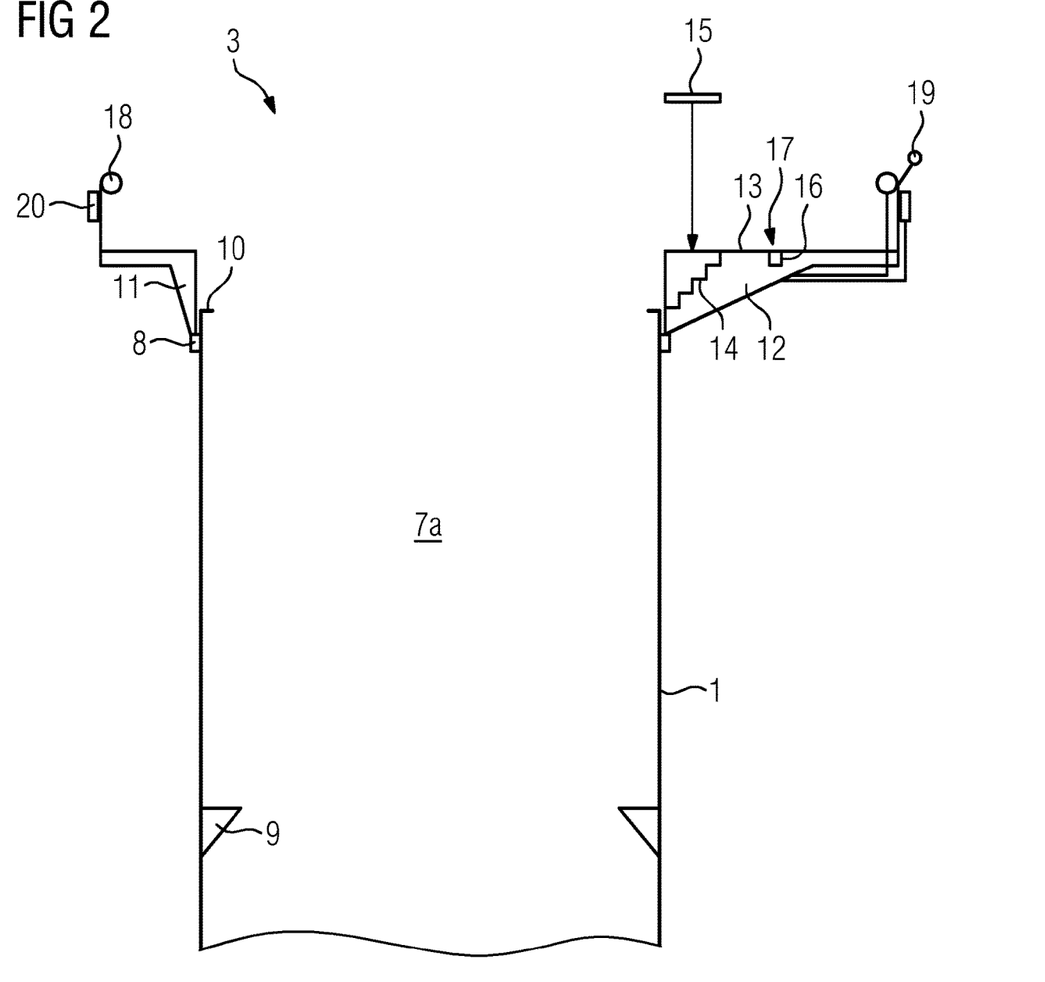
FIG. 2 shows the upper portion of the monopile with a foundation platform unit installed.

The monopile 1 is the first major component of the foundation installation system to be installed on the site of the planned offshore wind turbine. As can be seen in FIG. 2, which only shows the upper portion 3 of the monopile 1, the next major component to be installed at the site is a foundation platform unit 11 comprising a casted concrete structure 12 defining a foundation platform 13. As can be seen, the level of the foundation platform 13 is higher than the level of the third attachment interface 10, wherein the dimensions of the components and the positions of the attachment interfaces 8, 10 are chosen such that the foundation platform 13 will be level with the tower door once the tower is installed (see FIG. 5).

The foundation platform unit 11 can be bolted onto the flange of the first attachment interface 8, and/or the foundation platform unit 11 can be held in place based on gravity. In any case, the inner profile of the foundation platform unit 11 matches the outer profile of the monopile 1 so as to be interlockingly guided onto the first attachment interface 8. Additional guiding means may be provided.

It is noted at this point that the flanges of the attachment interfaces 8, 9 and 10 may also, in other embodiments, be sectioned such that bracket-like protrusions, spaced apart along the respective surface, are used. The components to be attached may have similar flanges to be placed adjacent to the corresponding flange of the corresponding attachment interface 8, 9, 10.

To be able to comfortably and safely access the interior of the monopile 1, in particular the upper portion cavity 7a, a staircase 14 has been casted into the concrete structure 12 of the foundation platform unit 11. The staircase can later be covered by a cover plate 15 once access to the interior is provided by the tower door. In this embodiment, threaded holes 16 have been also been casted into the concrete structure 12 to provide installation aids 17 for installing certain installation devices, in particular a protective cap and/or cable moving devices, for example a cable pulling device. During casting, also means for cable installation have been casted into the concrete structure 12, in particular tubes leading to the locations of electrical installations, like navigation lights 18, or to sockets. The sockets are placed near or in the wall of the staircase 14.

The foundation platform unit 11 has been completely manufactured and pre-installed at the corresponding supplier, hence already comprises appurtenances such as handrails and gates, identification means, an anchor point 19, and the like. Further navigation aids 20 can also be provided. At the supplier, the electrical installations of the foundation platform unit 11 have already been tested such that all systems work according to specifications.

Figure 3:
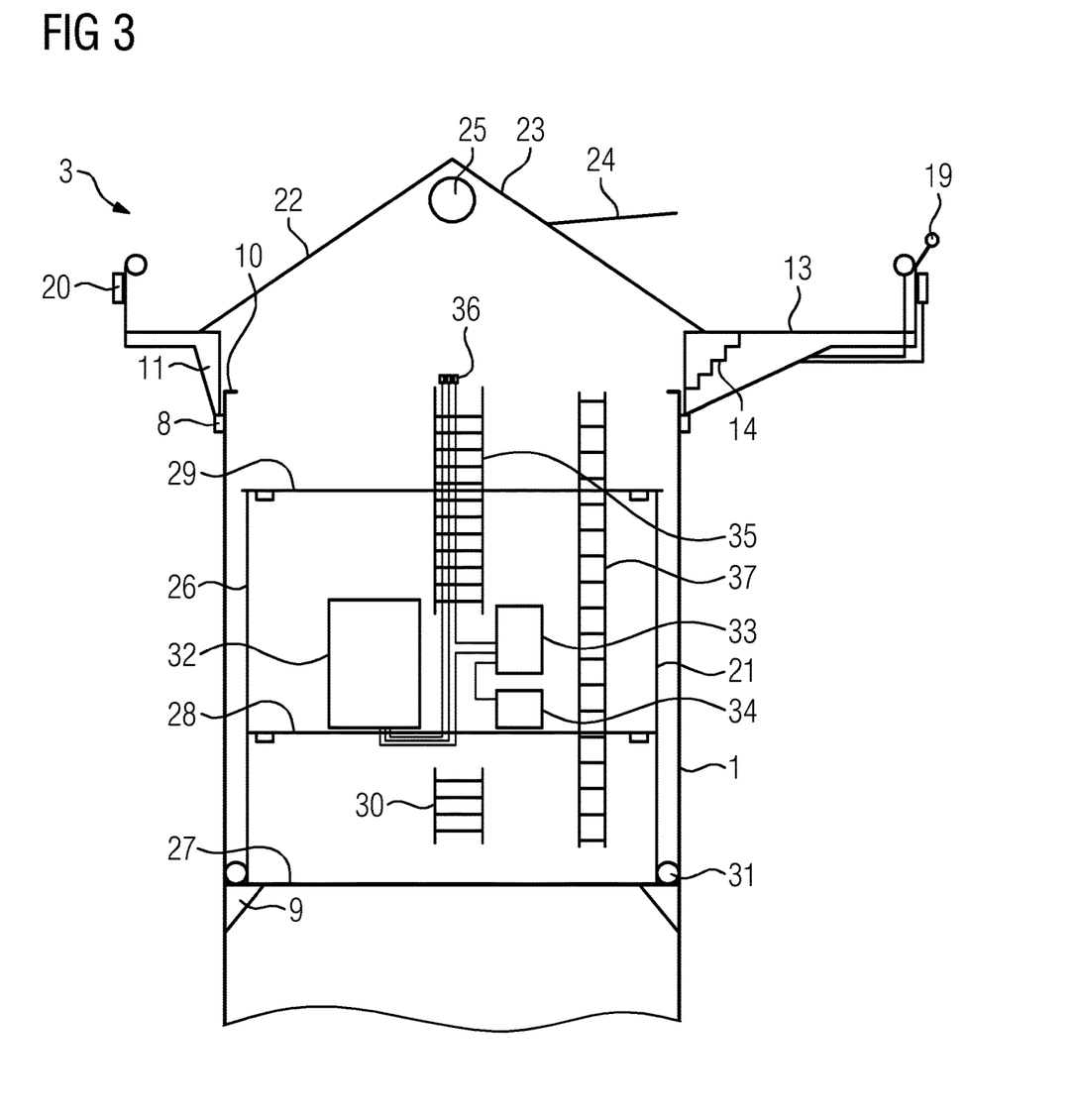
FIG. 3 is a principle drawing showing the upper portion of the monopile after installation of an electrical platform unit and a protective cap.

Turning now to FIG. 3, the third and final major component of the foundation installation system has been added, namely the electrical platform unit 21 being installed in the upper portion cavity 7a of the monopile 1. In addition, a protective cap 22 has been added which comprises a protective screen 23 to protect the interior of the monopile 1 in the upper portion 3 from environmental influences like rain. As can be seen, the protective cap further comprises an access hatch 24 positioned on top of the staircase 14 to provide easy access to the staircase 14 and thus the interior of the monopile 1 or upper portion 3. In this embodiment, the protective cap 22 also comprises a cable pulling device 25 (only indicated) which will be discussed later with respect to FIG. 4.

The electrical platform unit 21 comprises a supporting structure 26 which, in this embodiment, comprises three platforms, namely a hang-off platform 27, a switch gear platform 28 and a tower installation platform 29 (which can also be termed airtight deck or platform). The supporting structure is standardized and implemented using steel profiles and floor plating for the platform 27, 28 and 29, wherein also cable guiding means are already prepared with surface protection and coating means. The electrical platform unit 21 is thus a serially producible, transportable product.

The hang-off platform 27 is especially reinforced to carry the weight of a connection cable to be pulled up from the bottom 5 of the monopile 1 using the cable pulling device 25 and comprises a clamping device 30 for the connection cable. The hang-off platform 27 also includes sealing means 31, such that the hang-off platform 27 also functions as an airtight deck.

The switch gear platform 28 comprises multiple pre-installed electrical devices, in particular at least one switchgear 32, an LV panel 33 and/or a fiber box 34. Using cable guiding means 35, interior cables of the still-to-install wind turbine can be connected using a plug plate 36 at the same level as the third attachment interface 10.

It is noted that, of course, the supporting structure 26 also comprises climbing aids and the like, for example access ladder 37.

The following installation steps comprise pulling up the connection cable to at least the hang-off platform 27, cutting and grinding to strip the individual conductors for further connecting them, and cleaning the area of the upper portion cavity 7a.

Figure 4:
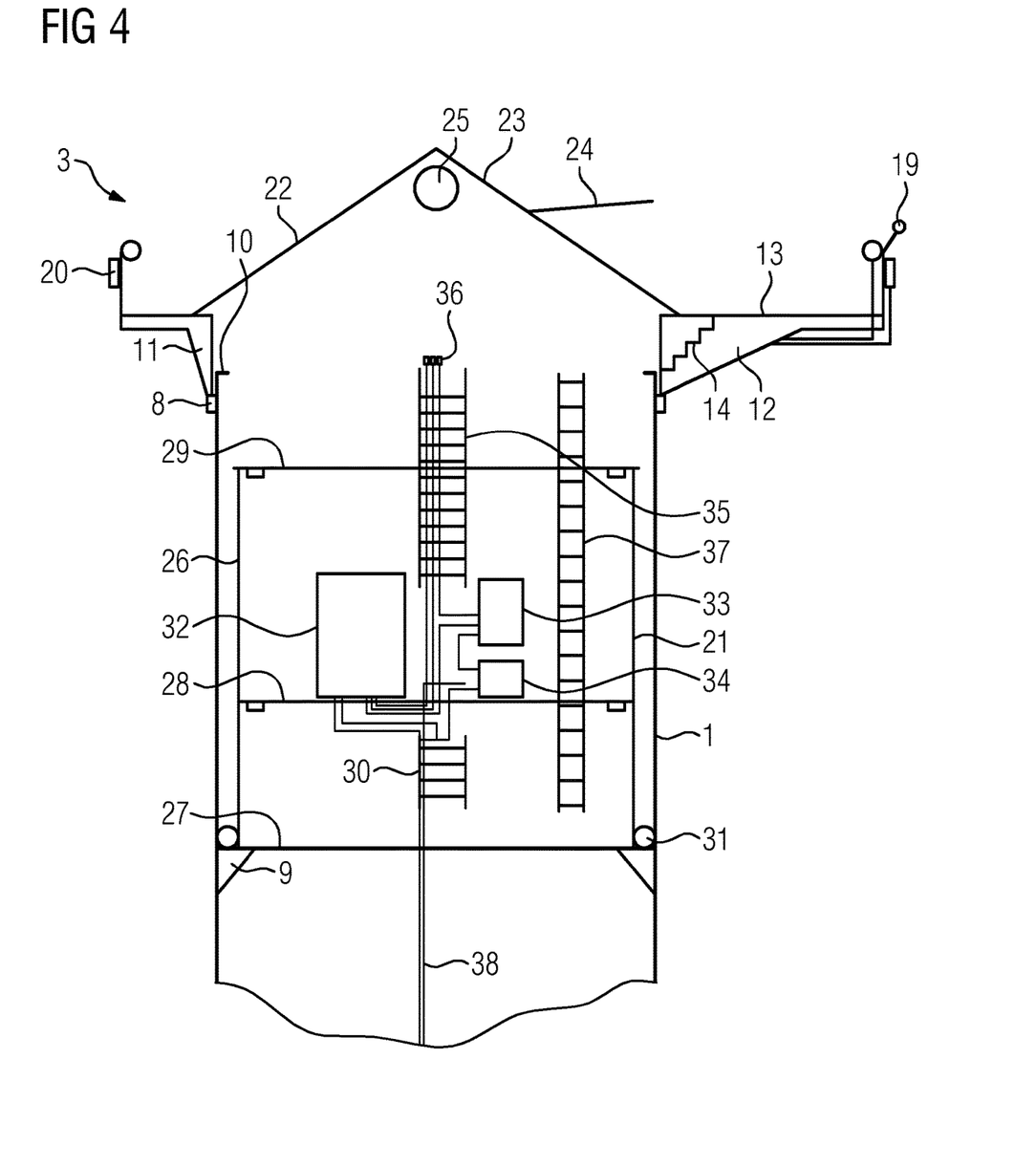
FIG. 4 shows the view of FIG. 3 after connection cable pulling and installation works.

FIG. 4 shows the state of the monopile foundation after the connection cable 38 has been pulled up and all connections have been made. Now, a test can be performed on the cable system to provide a clear indication that everything works.

Figure 5:
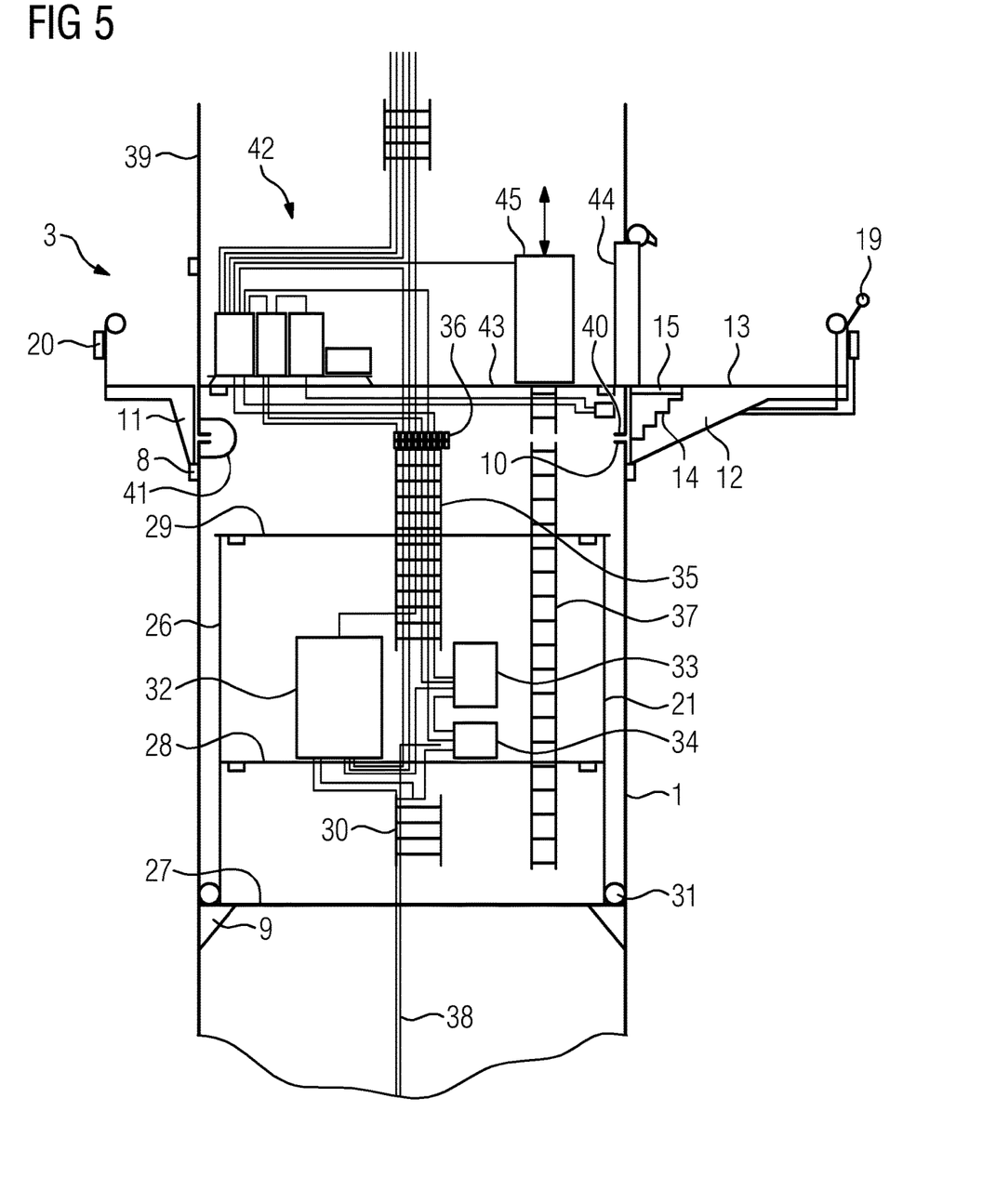
FIG. 5 is a principle drawing of the monopile foundation with a mounted tower of an offshore wind turbine.

Subsequently, the tower of the wind turbine can be installed as well as the other components of the wind turbine, for example the nacelle and the rotor. The state after installation of the wind turbine tower 39 using the third attachment interface 10 (and a respective flange 40 of the tower 39, wherein the bolts connecting these may be easily be tightened from the tower installation platform 29) is shown in FIG. 5. Additional to the mechanical attachment using the third attachment interface 10, an earthing cable 41 connects the tower 39 with the monopile 1. Internal cabling 42 of the offshore wind turbine has been connected using the plug played 36.

As can be seen from FIG. 5, the bottom floor 43 of the tower 39 is flush with the foundation platform 13, where the staircase 14 has been closed using the plate 15. The tower 39 can be comfortably entered using the tower door 44. Inside the tower 39, the pre-installed tower lift 45 can immediately be used without need for an extension of the tower lift 45 or any climbing.

Since the upper portion 3 of the monopile 1 including the attachment interfaces 8, 9 and 10 is standardized, clear requirements for the foundation platform unit 11 and the electrical platform unit 21 can be formulated, such that multiple suppliers can be involved into the installation of offshore wind turbines in a wind park.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The invention claimed is:

1. A foundation building system for an offshore wind turbine, comprising:
a monopile to be placed on a seabed, having an upper portion with a first attachment interface for physically supporting a foundation platform unit placed onto the first attachment interface, at least one internal, second attachment interface in an interior cavity of the monopile for attaching at least one electrical platform unit, and a third attachment interface for attaching a tower of the offshore wind turbine atop the at least one electrical platform unit, wherein the upper portion is configured to be placed at least partly above sea level;
wherein the foundation platform unit provides at least one foundation platform extending around the tower when installed;
wherein the at least one electrical platform unit includes at least one platform for electrical equipment for guiding and/or connecting of a connection cable for connecting the offshore wind turbine;
wherein the first attachment interface and third attachment interface are at a same height of the monopile, being formed by an interior flange of the third attachment interface opposed to an exterior flange of the first attachment interface.

2. The foundation building system according to claim 1, wherein at least one of the first attachment interface, the at least one internal, second attachment interface, and the third attachment interface comprises a flange and/or at least one protrusion for attachment via a nut-and-bolt arrangement.

3. The foundation building system according to claim 1, wherein dimensions of the foundation platform unit to be attached to the monopile and a position of the first attachment interface are chosen such that the foundation platform is level with a tower entrance of the tower when both are installed on the monopile.

4. The foundation building system according to claim 1, wherein the foundation platform unit comprises a staircase at an inner boundary of the foundation platform unit allowing access to the interior cavity and/or the at least one electrical platform unit in the monopile when the foundation platform unit has been installed.

5. The foundation building system according to claim 4, further comprising a cover plate for the staircase after installation of the tower.

6. The foundation building system according to claim 1, wherein the foundation platform unit comprises at least one installation aid for at least one installation device used during installation for protection of the interior cavity prior to installation of the tower.

7. The foundation building system according to claim 6, wherein the installation aid comprises a least one threaded hole in a foundation platform cast in during casting of a concrete structure.

8. The foundation building system according to claim 1, wherein the foundation platform unit further comprises an electrical installation, a boat landing arrangement and/or an anchor point at least one cable installation means, at least one socket adjacent to or in a wall of the staircase, a handrail, a gate, and/or an identification means.

9. The foundation building system of claim 8, wherein the electrical installation is navigation lights, and the at least one cable installation means are tubes cast into a concrete structure.

10. The foundation building system of claim 1, further comprising a protective cap for protection of the interior cavity prior to installation of the tower.

11. The foundation building system according to claim 10, wherein the protective cap comprises a cable moving device for pulling the connection cable from an entry point into the monopile or from outside into an upper portion cavity, and/or an entry hatch, aligned with a staircase.

12. The foundation building system according to claim 1, wherein the electrical platform unit comprises at least one of:
- a hang-off platform having a clamping device for the connection cable, supporting a weight of the connection cable guided up through the monopile;
- a switchgear platform having at least one switchgear for connecting to the connection cable to an interior cabling assembly; and
- a tower installation platform extending below the third attachment interface.

13. The foundation building system according to claim 12, wherein the electrical platform unit and/or the second attachment interface further comprises a sealing means for sealing the upper portion cavity containing the electrical platform unit from the interior cavity extending below a level of the hang-off platform.

14. The foundation building system according to claim 12, wherein at least two electrical platform units are provided, one implementing the hang-off platform and another implementing at least the switchgear platform.

15. A method for installing an offshore wind turbine using a foundation building system according to claim 1, comprising the steps of:
- installing the monopile at a predetermined location for the offshore wind turbine in the seabed;
- installing the foundation platform unit on the monopile using the first attachment interface;
- installing the electrical platform unit inside the interior cavity using the second attachment interface;
- connecting the connection cable in the electrical platform unit; and
- installing the wind turbine using the third attachment interface.

16. The foundation building system of claim 1, wherein the first attachment interface extends radially outward from an exterior surface of the monopile, and includes a flat engagement surface facing upwards.

17. The foundation building system of claim 1, wherein the flat engagement surface of the first attachment interface engages a corresponding surface of the foundation platform unit when the platform foundation unit is installed onto the first attachment interface.

* * * * *